(12) United States Patent
Tassakos et al.

(10) Patent No.: US 7,746,483 B2
(45) Date of Patent: Jun. 29, 2010

(54) METHOD AND DEVICE FOR ADJUSTING GAP DIMENSIONS AND/OR AN OFFSET BETWEEN A VEHICLE HOOD AND THE REMAINING VEHICLE BODY

(75) Inventors: Charalambos Tassakos, Würselen (DE); Jan-Thomas Metge, Stuttgart (DE)

(73) Assignee: inos Automationssoftware GmbH, Stuttgart (DE)

( * ) Notice: Subject to any disclaimer, the term of this patent is extended or adjusted under 35 U.S.C. 154(b) by 0 days.

(21) Appl. No.: 12/461,978

(22) Filed: Aug. 31, 2009

(65) Prior Publication Data

US 2009/0326701 A1    Dec. 31, 2009

Related U.S. Application Data

(63) Continuation-in-part of application No. 10/571,925, filed as application No. PCT/EP2004/008875 on Aug. 7, 2004, now abandoned.

(30) Foreign Application Priority Data

Oct. 18, 2003   (DE)  ................ 103 48 500

(51) Int. Cl.
   *G01B 11/14* (2006.01)
   *B23Q 17/00* (2006.01)
(52) U.S. Cl. .............. 356/614; 356/625; 29/407.1; 29/468
(58) Field of Classification Search ......... 356/623–625, 356/600–601, 606, 614; 250/559.2, 559.09, 250/559.12, 559.23, 559.27, 559.29; 29/407.1, 29/430, 559, 283, 21; 219/121.64
   See application file for complete search history.

(56) References Cited

U.S. PATENT DOCUMENTS

| | | | | |
|---|---|---|---|---|
| 4,498,776 A | * | 2/1985 | Smith | 356/623 |
| 4,589,184 A | * | 5/1986 | Asano et al. | 29/430 |
| 4,666,303 A | * | 5/1987 | Pryor | 356/606 |
| 5,129,010 A | * | 7/1992 | Higuchi et al. | 382/154 |
| 5,225,690 A | * | 7/1993 | Sakai et al. | 250/559.09 |
| 5,380,978 A | | 1/1995 | Pryor | |

(Continued)

FOREIGN PATENT DOCUMENTS

JP          12 44 989        9/1989

(Continued)

*Primary Examiner*—Sang Nguyen
(74) *Attorney, Agent, or Firm*—Paul Vincent

(57) ABSTRACT

The invention relates to a method and a device (1) for adjusting the gap dimensions and/or an offset between a movable hood (2) of a motor vehicle and the remaining body (3) of said motor vehicle. The hood (2) is first fitted and retained in a roughly adjusted assembly position so as to be as flush as possible with the body (3), whereupon the hood (2) is finely adjusted such that predefined values are matched as closely as possible for the gap dimensions and/or the offset. In order to be able to adjust the gap dimensions and/or the offset as simply, quickly and flexibly as possible in a contactless manner, actual values (21 ist) for the gap dimensions and/or the offset between the hood (2) and the remaining body (3) are optically detected for the fine adjustment. Triggering signals (24) for at least one actuating member (12) are determined in accordance with the detected actual values (21 ist) and predefined set point values (21-soll) for the gap dimensions and/or the offset.

15 Claims, 5 Drawing Sheets

U.S. PATENT DOCUMENTS

| | | | | |
|---|---|---|---|---|
| 5,416,590 A | * | 5/1995 | Stover et al. | 356/623 |
| 5,999,265 A | * | 12/1999 | Dalancon et al. | 356/614 |
| 7,100,258 B2 | * | 9/2006 | Tassakos et al. | 29/407.1 |
| 2004/0179206 A1 | | 9/2004 | Tassakos | |
| 2006/0137164 A1 | * | 6/2006 | Kraus | 29/407.1 |

FOREIGN PATENT DOCUMENTS

| | | |
|---|---|---|
| JP | 42 40 028 | 8/1992 |
| JP | 11 53 388 | 2/1996 |

* cited by examiner

METHOD AND DEVICE FOR ADJUSTING GAP DIMENSIONS AND/OR AN OFFSET BETWEEN A VEHICLE HOOD AND THE REMAINING VEHICLE BODY

This application is a continuation in part of Ser. No. 10/571,925 filed on Mar. 15, 2006 now abandoned as the national stage of PCT/EP2004/008875 filed on Aug. 7, 2004 and also claims Paris Convention priority of DE 103 48 500.7 filed on Oct. 18, 2003, the entire disclosures of which are hereby incorporated by reference.

BACKGROUND OF THE INVENTION

The present invention concerns a method and a device for adjusting the gap dimensions and/or an offset between a movable flap of a vehicle and the remaining vehicle body. The method comprises initial fitting and retention of the flap in a roughly adjusted installation position flush with the body. Finally, the flap is finely adjusted such that predetermined values of the gap dimensions and/or the offset are matched as closely as possible.

The assembly of vehicles includes i.a. the installation of flaps. Flaps are, in particular, the doors of the vehicle, but also the hood and trunk lids or rear flap. The flaps are inserted into corresponding openings in the body and are movably mounted to the body via hinges or joints at a suitable installation position, such that they can be rotated about an axis of rotation. A suitable installation position is characterized by the flaps being substantially flush with the remaining body or with previously fitted neighboring flaps, and have a uniform separation from the remaining body or the neighboring flaps. One thereby strives for predetermined gap dimensions and a particular offset in the installation position. The flap can be movably fixed to the body in the finely adjusted, installation position.

A flap is conventionally mounted to the hinges or joints on the body in a roughly adjusted installation position. At least one wedge-shaped element, a so-called key collar is inserted into the gap between the flap and the remaining body or the neighboring flaps, to fit the flap into the opening, flush with the body. The flap is then finely adjusted such that predetermined gap dimensions are matched as closely as possible. A worker moves the flap in the opening and examines the gap dimensions and/or the offset. He/she must always see to it that the key collar keeps the flap flush with the body. When the flap is in the finely adjusted installation position, it is finally movably fixed to the hinges or joints on the body. The use of a key collar is, however, very expensive and produces relatively inaccurate results which are difficult to reproduce and document.

German patent application 102 51 393, filed on Nov. 5, 2002 by Dr.-Ing. Charalambos Tassakos, also extensively describes another method or device for adjusting the gap dimensions and/or an offset between a movable flap of a vehicle and the remaining body. This patent application describes a so-called mechanical key collar simulation which is characterized in that the flap is pulled by a pneumatic suctioning means against a mechanical stop in the roughly adjusted installation position to effect fine adjustment, wherein the mechanical stop is fixed relative to the remaining body and is freely pivotable about an axis of rotation which extends in a substantially vertical direction. The mechanical stop thereby represents an extrapolation of the surface of the remaining body, relative to which the gap dimensions and/or the offset of the flap is to be adjusted. The pneumatic suctioning means pulls the flap against the mechanical stop and thereby into the surface of the remaining body such that it is substantially flush with the remaining body. The proposed method uses a mechanical stop and a pneumatic suctioning means instead of a key collar. For this reason, the above-described method is also called mechanical key collar simulation.

The mechanical key collar simulation is particularly well suited for adjusting the gap dimensions and/or the offset between the side doors and the remaining body of a vehicle. It is easier to fit flaps on the sides of a vehicle, since the surfaces of the vehicle body, or of the already fitted flaps map over into the surface of the flap to be fitted in a substantially planar fashion. However, use of the mechanical key collar simulation is difficult when the surfaces of the remaining body or of previously fitted flaps do not map over into the surface of the flap to be fitted in a flat fashion, rather at a certain angle. This is the case e.g. in the region of the motor hood, the trunk lid or the rear flap of a vehicle, where the flaps merge into the fenders. The use of mechanical key collar simulation at these locations either requires great effort or is completely impossible.

Moreover, in the mechanical key collar simulation, the mechanical stop, which is guided to the measuring location using a robot or a similar manipulation device, causes relatively large forces to act on the surfaces of the remaining body or previously fitted flaps and on the surfaces of the flaps to be fitted. These forces are even increased by the pneumatic suctioning means which pulls the flap to be fitted against the mechanical stop. These forces may deform the body or the flaps, which could produce inaccuracies during adjustment of the gap dimensions or the offset.

During the preliminary construction phase of a motor vehicle, the body of the car is in the form of welded together sheet metal with pivotally attached flaps (doors, trunk lid, and hood). In this state, the body of the car is not equipped with locks, door handles or fixtures. Prior to final assembly, it is necessary to check whether or not the gaps between the flaps and the remaining portions of the motor vehicle body are within acceptable tolerances. Towards this end, the flaps must temporarily be held in a defined position relative to the remaining portions of the body for the duration of the measurement. Prior art uses so-called key collars for this purpose. A proposed further development of the key collars is referred to as a mechanical key collar simulation (see DE 102 51 393 A1).

Departing from the above-described prior art, it is the underlying purpose of the present invention to provide a simpler and less expensive key collar simulation which still permits highly accurate fitting of a flap into the remaining vehicle body, irrespective of the angle between the surface of the body or a fitted flap and the surface of the flap to be fitted.

SUMMARY OF THE INVENTION

The object of the invention is achieved by a method and with an associated device. The inventive method provides for key collar simulation in association with mounting and alignment of a moveable flap to a body of a motor vehicle. The method comprises the following steps:

a) initially mounting the flap to the body in a roughly adjusted installation position for motion about an axis of rotation;

b) optically detecting, following step a) and prior to painting the motor vehicle as well as prior to final mounting of locks, handles, and fixtures to the flaps and remaining body, actual values for a gap or offset between the flap and remaining portions of the body;

c) generating, in dependence on the actual values detected in step b) and on specified desired values corresponding to a properly aligned position of the flap, drive signals for variation of a position and orientation of the flap relative to the remaining portions of the body using at least one actuating element cooperating with the flap; and d) regulating the at least one actuating element using the drive signals to pivot the flap about the axis of rotation for approximating the properly aligned position of the flap.

The invention is therefore neither directed to the installation of the flaps in the body nor to measurement of gap widths during the final stages of assembly for purposes of quality control. In accordance with the invention, the offset between the flap and the remaining portions of the body is compared with specified desired values thereof and the flap is automatically driven for pivoting about its rotational axis such that the actual position of the flap relative to the remaining portions of the body corresponds to the specific desired values thereof. Moreover, this procedure is performed prior to the final assembly of the motor vehicle body. As soon as the flap is in the defined reproducible pivot position, the width of the gap can be measured relative to the remaining positions of the vehicle body. The invention is therefore directed to a procedure which is utilized only in the preliminary constructional phase during which neither locks nor handles are attached to the flaps and the surrounding portions of the vehicle body. The method in accordance with the invention is carried out during a stage of assembly in which the flaps have been previously mounted in a pivotable fashion to the remaining portions of the motor vehicle body. After carrying out the procedure in accordance with the invention, the motor vehicle body with the pivotally attached flaps is painted and prepared for final assembly during which the locks, fixtures and handles are attached to the flaps and to the associated portions of the motor vehicle body. In this end assembly phase, the geometry of the gaps between the flaps and the remaining portions of the motor vehicle body can be easily measured, since the flaps are properly held in a defined and reproducible pivotal position with respect to the remaining portions of the motor vehicle body by means of the locks and associated fixtures. This is, however, not the case during the preliminary constructional phase of assembly to which the invention as amended is explicitly directed. The present invention can therefore be described as a "regulated key collar simulation".

In accordance with the invention, for fine adjustment,
the actual values for the gap dimensions and/or the offset between the roughly adjusted flap and the remaining body, are optically detected;
depending on the detected actual values and predetermined desired values of the gap dimensions and/or the offset, drive signals are generated for at least one actuating element acting on the flap to facilitate variation of the position and orientation of the flap relative to the body; and
the gap dimensions and/or the offset are approximated to the specified desired values through driving the at least one actuating element via the drive signals.

One important aspect of the present invention is that the method operates in a contact-free manner in the region of the measuring location where the actual values of the gap dimensions and/or the offset are detected. This permits detection of the actual values even in the region of the measuring location, which is not possible with mechanical key collar simulation.

The overall inventive method is realized in the form of a control or regulation means, wherein the control or regulating variable is the transition (gap dimensions and/or offset) between the flap to be fitted and the remaining body. The control or regulation means may be realized with little expense using software which runs on a suitable computer, in particular, a microprocessor. Realization of the key collar simulation mainly by software gives the user a particularly great deal of flexibility concerning e.g. predetermination of any desired values of the gap dimensions and/or the offset between the flap to be fitted and the remaining body. In this manner, an amount of lead may e.g. be set for fine adjustment such that doors which are fitted in the sides of the body slightly protrude past the body. Such fitting of the flaps into the remaining body with an amount of lead can reduce wind noises in the region of the gaps.

Moreover, the key collar simulation regulated or controlled in accordance with the invention permits fitting of a flap into the opening of a vehicle body with extremely high accuracy, since the gap dimensions and/or the offset are detected with extreme accuracy by suitable optical detecting means and the gap dimensions and/or the offset are detected in a contact-free manner such that the body or flap are not deformed.

In accordance with an advantageous further development of the present invention, the gap dimensions and/or the offset is/are controlled to the predetermined desired values. This further development comprises a regulation means for approximating the transition (gap dimension and/or offset) between the flap to be fitted and the remaining body to at least one predetermined desired value. The transition is preferably exactly adjusted to the desired value, but under certain circumstances, a control deviation may be produced. The regulation means usually attempts to zero the control deviation between the detected actual value and the predetermined desired value or the transition between the flap to be fitted and the remaining body. The regulation algorithm is preferably implemented in a computer program which can be run on a computer, with the optically detected actual values of the transition being supplied to the computer program. Alternatively, the computer program can be supplied with digital records from a measuring location, wherein the computer program assesses the records to detect at least one actual value of the transition (the gap dimensions and/or the offset) at the measuring location. Depending on the detected actual values and on the specified desired values of the transition, the computer program generates drive signals for the actuating elements and guides the drive signals to the actuating elements either directly or indirectly via suitable interfaces.

In accordance with a preferred embodiment of the invention, the desired values of the gap dimensions and/or the offset of the flap are predetermined in relation to the remaining body in such a manner that the transition between the flap and the remaining body at a measuring location is zero. A zero transition corresponds to a flap which is flush with the remaining body. A transition can be defined either as subjective opinion of one or more observer/s (e.g. the members of staff responsible for quality assurance) or objectively by a certain mathematical description. A mathematical description of the transition can ensure that the transition can be detected and adjusted in an exact and reproducible manner.

U.S. Pat. No. 4,498,776, U.S. Pat. No. 4,666,303, U.S. Pat. No. 5,416,590 and U.S. Pat. No. 5,999,265 disclose e.g. a mathematical description of the transition. These documents disclose various possible analytic descriptions of a transition between two parts, preferably between a flap and the remaining body of a vehicle. The mathematical definitions of a transition given in these documents are hereby incorporated by reference. There are of course many other feasible analytical descriptions of a transition.

Alternatively, the desired values for the gap dimensions and/or offset of the flap are predetermined relative to the remaining body in such a manner that a positive transfer of more than zero is obtained between the flap and the remaining body at a measuring location. A positive transition corresponds to a flap which is fitted into the remaining body in such a manner that it slightly projects outwardly past the surface of the remaining body when the vehicle is at rest. Such presetting of the desired values is important, in particular, for fitting the side doors into the remaining body, since wind noises that may be produced in the region of the gaps during traveling can thereby be reduced.

In accordance with a preferred embodiment of the present invention, the flap is initially mounted to the body in the roughly adjusted installation position such that it can be rotated about an axis of rotation with at least one actuating element acting on the flap to vary a position and orientation of the flap about the axis of rotation. The flap can thereby be moved about the axis of rotation without being deformed. In this manner, the gap dimensions and/or the offset between the movable flap and the remaining body of a vehicle can be adjusted with much greater accuracy.

In accordance with another advantageous further development of the invention, the actual values of the gap dimensions and/or offset between the flap of the vehicle and the remaining body are initially detected at a first measuring location and approximated to specified desired values, and the actual values are subsequently detected at least one further measuring location and approximated to specified desired values. This further development proposes detection of the gap dimensions and/or offset between a roughly adjusted flap and the remaining body at different measuring locations, fine adjustment of the flap in this manner and fitting thereof in a predetermined position and orientation relative to the remaining body. Application of the method according to this further development is particularly easy when means for optical detection of the gap dimensions and/or the offset are moved to the different measuring locations for performing the measurement using an industrial robot or another manipulation device.

A flap which is finely adjusted relative to the remaining body is preferably movably disposed on the body, i.e. mounted to hinges or joints. It is however, also feasible that fitting of the flap in the finely adjusted installation position merely serves to check whether or not a certain flap can be fitted in the specified installation position of the body while thereby observing the specified desired values for the gap dimensions and/or the offset. If this is possible, the flap can be removed again from the body after fitting e.g. for subsequent painting, separately from the remaining body.

In the event that the flap cannot be fitted into the remaining body as desired or if the transition between the flap to be fitted and the remaining body cannot be adjusted to a desired value, different measures can be taken. The flap and/or the remaining body bordering the flap could be plastically deformed in such a manner that the transition at selected measuring locations approximates the specified desired values if the deviation between the actual values, approximated to the desired values, and the specified desired values exceeds a predetermined limit value.

If the deviation between the actual values, approximated to the desired values, and the specified desired values exceeds a specified limit value at at least one measuring location, a request can be made to the production line for production of further flaps and/or a request can be made to the installation line for installation of further flaps on the remaining body of vehicles, wherein the production and/or installation parameters of the production line or the installation line can be varied in dependence on the response. The flap which is improperly fitted, positioned and oriented may thereby be left in that location or a new flap may be fitted. With this feedback, a type of (slow) control loop can be closed to optimize production and installation of further flaps in such a manner that the flaps can be optimally fitted into the body. The slow control loop is then superposed onto the (faster) inventive regulation or control means for fitting a flap into the remaining body.

Realization of the inventive method in the form of a computer program is particularly important. The computer program is programmed to perform the inventive method and can be run on a computer, in particular, a microprocessor. In this case, the invention is realized by the computer program with this computer program representing the invention in the same way as the method for the performance of which the computer program is suited. The computer program is preferably stored on a storage element. The storage element may, in particular, be an electronic storage medium, e.g. a random access memory (RAM), a read only memory (ROM) or a flash memory.

A further solution of the object of the present invention is effected by a device of the above-mentioned type, the device having means for fine adjustment comprising:

detecting means for optical detection of the actual values for the gap dimensions and/or the offset between the roughly adjusted flap and the remaining body;

computing means for generating drive signals for at least one actuating element in dependence on the detected actual values and specified desired values for the gap dimensions and/or the offset; and at least one actuating element, wherein the actuating element acts on the flap to vary the position and orientation of the flap relative to the remaining body, and approximates the gap dimensions and/or the offset to the specified desired values via driving with the drive signals.

In accordance with an advantageous further development of the present invention, the detecting means comprise a camera laser unit. Such a camera laser unit comprises at least one illumination means, in particular a laser, and at least one image recording means, in particular a CCD camera or a CMOS camera. A camera laser unit of this type is also called a laser sensor and is e.g. extensively described in German patent application 103 11 247, filed on Mar. 14, 2003 by Inos Automationssoftware GmbH. The construction and function of such a camera laser unit disclosed in this document is hereby incorporated by reference.

The actuating element may be designed in any way. A hydraulically or pneumatically driven cylinder would e.g. be feasible as an actuating element. In a preferred embodiment of the invention, the at least one actuating element comprises an electromotor. The at least one actuating element preferably comprises an electric stepping motor.

Finally, the device may comprise an industrial robot or another manipulation device to which the detecting means are mounted and which moves the detecting means to predetermined measuring locations for detecting the actual values for the gap dimensions and/or the offset between the flap of a vehicle and the remaining body at those locations.

Further features, applications and advantages of the invention can be extracted from the following description of embodiments of the invention which are shown in the drawing. The features described or shown represent the object of the invention either individually or in arbitrary combination irrespective of their summary in the claims or their dependencies and irrespective of their formulation or illustration in the description or drawing.

DESCRIPTION OF THE PREFERRED EMBODIMENT

Figure 1:
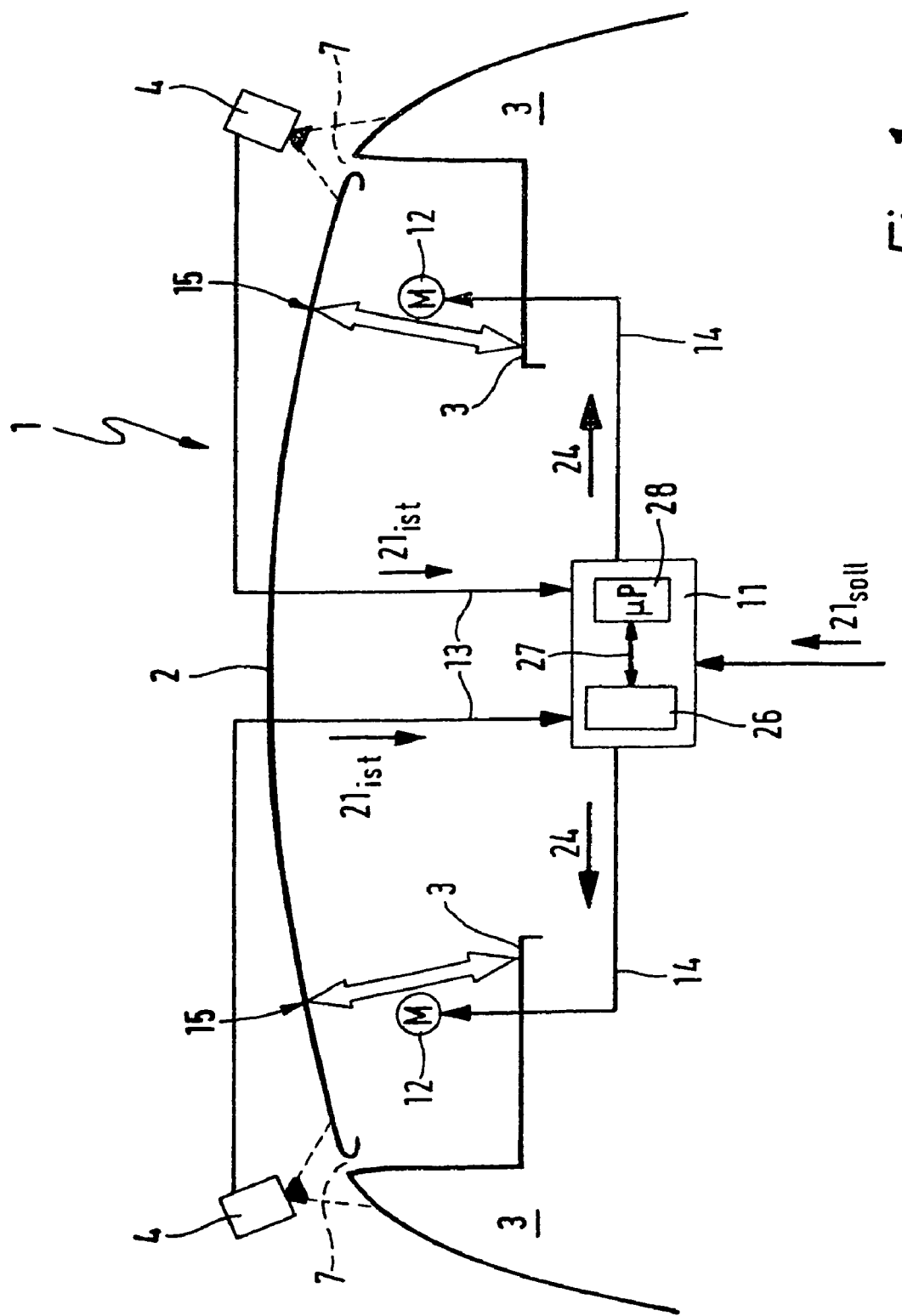
FIG. 1 shows an inventive device for adjusting gap dimensions and/or an offset between a movable flap of a vehicle and the remaining vehicle body in accordance with a preferred embodiment.

FIG. 1 shows an inventive device which is designated in total by reference numeral 1. The device 1 serves for adjusting the gap dimensions and/or the offset between a movable flap 2 of a vehicle and the remaining body 3 of the vehicle. FIG. 1 shows a vertical section through the vehicle, transverse to a longitudinal vehicle axis. The movable flap 2 in this example is a motor hood or a trunk lid. The remaining body 3 of the vehicle is represented by the fenders.

The movable flap 2 is initially mounted to the remaining body 3 in a roughly adjusted installation position via hinges or joints such that the flap 2 can be rotated about an axis of rotation. The movable flap 2 is fitted in the roughly adjusted installation position in a special installation space of the body 3, preferably using an industrial robot or other manipulation device. The movable flap 2, fitted in the roughly adjusted installation position, is held by the hinges and optionally also by the industrial robot or the manipulation device.

After rough adjustment, the flap 2 must be fitted into the installation space of the body 3 into a finely adjusted installation position. Fine adjustment is required to be able to exactly maintain specified values of the gap dimensions and/or the offset. This is particularly important, since inaccurate gap dimensions or excessive offset of the flap 2 relative to the remaining body 3 of a vehicle can produce disturbing wind noises during travel. Moreover, the visual impression of the vehicle to the viewer would be impaired by irregular gap dimensions or excessive offset. This applies, in particular, to vehicles having decorative strips or vehicle lights which do not border a gap, but which extend to both sides of the gap. In such cases, an irregular or excessive gap or offset would be particularly noticeable.

After fine adjustment of the flap 2 relative to the remaining body 3, the flap 2 is either fixed on the body 3 in the finely adjusted installation position or is removed, e.g. for separate painting of the flaps 2 and body 3. In the latter case, fitting of the flap 2 into the remaining body 3 merely serves to determine whether or not the shape of the flap 2 or of the remaining body permits satisfactory installation of the flap 2 into the provided installation space of the body 3 during later final assembly, thereby observing the specified desired values for the gap dimensions and/or offset.

The inventive method concerns, in particular, fine adjustment of the movable flap 2 relative to the remaining body 3 of the vehicle. The inventive device 1 comprises detection means 4 having an image detection means 8 which is preferably designed as CCD (Charged Coupled Device) camera or as CMOS (Complimentary Metal Oxide Semiconductor) camera (see FIG. 2). The detection means 4 serve for optical detection of the actual values for the gap dimensions and/or the offset between the roughly adjusted flap 2 and the remaining body 3.

The detection means 4 are explained in more detail below with reference to FIG. 2. Detection means 4 are designed as a camera laser unit or as a so-called laser sensor, and comprise a carrier element 5 to which the image detection means 8 is mounted. An illumination means 6 is additionally mounted to the carrier element 5 to illuminate a measuring location 7 in the region of a transition between the flap 2 and the remaining body 3 and/or images a pattern on the surfaces to be detected at the measuring location 7. The illumination means 6 is designed e.g. as a laser. It is theoretically sufficient for the detection means 4 to comprise only one optical image detection means 8. The illumination means 6 which illuminates the measuring location 7 and provides it with a pattern considerably facilitates detection of the gap dimensions and/or of the offset between the flap 3 and the remaining body 2, thereby also improving the accuracy.

Figure 2:
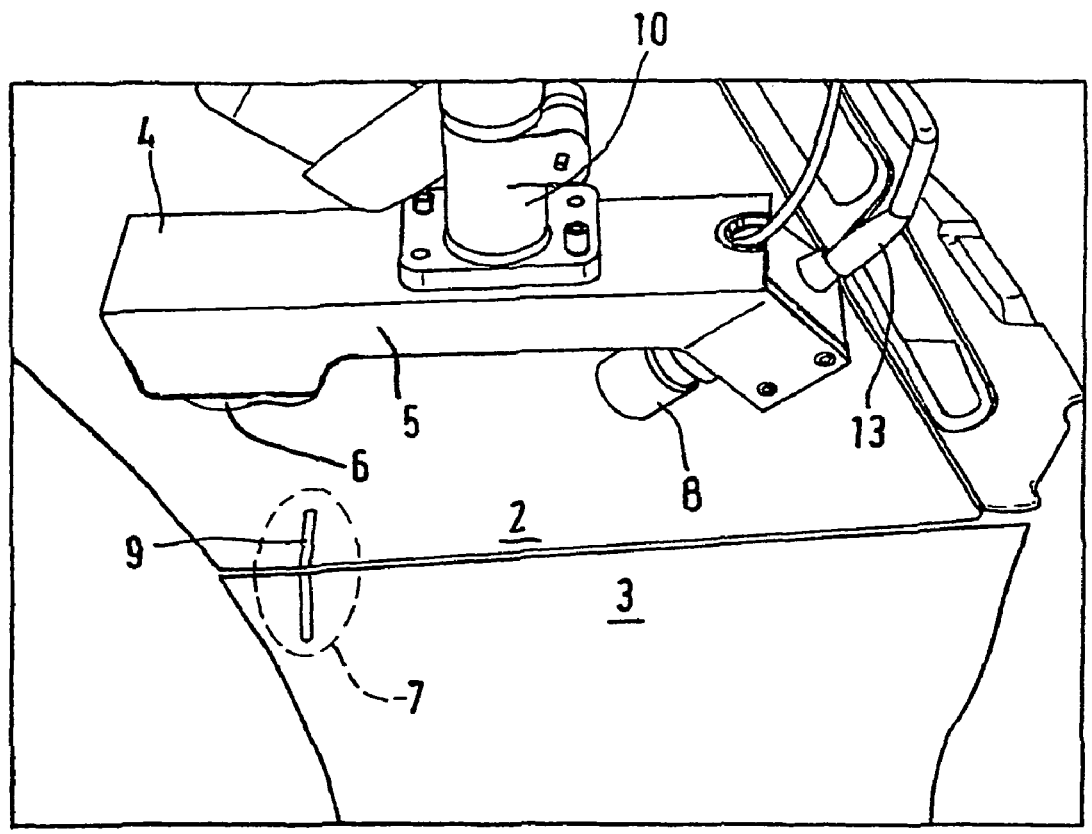
FIG. 2 shows a section of the inventive device according to FIG. 1 with detecting means for optical detection of the gap dimensions and/or the offset between the flap to be fitted and the remaining body in accordance with a preferred embodiment.

In the embodiment of FIG. 2, the laser 6 generates a sharply defined light line 9 in the region of the measuring location 7, which extends across the gap, from the flap 2 and the body 3. The illumination means 6 could, of course, also generate light lines extending parallel to the gap at the facing edges of the flap 2 and body 3, as is disclosed e.g. in DE 199 10 699 or the corresponding U.S. Pat. No. 6,529,283. In accordance with the invention, any method for detecting the transition between the flap 2 and the body 3 may be used.

The detection means 4 are mounted to a distal end of an industrial robot arm 10 or to any other manipulation device. The robot or the manipulation device moves the detection means 4 to predetermined measuring locations 7 for detecting the actual values of the gap dimensions and/or the offset between the flap 3 of the vehicle and the remaining body 2, at that location.

The device 1 also comprises (see FIG. 1) computing means 11 which are preferably designed in the form of a personal computer (PC). The computing means 11 comprise an electronic storage element 26 on which a computer program is stored and which is programmed to perform the inventive method. The storage element 26 is preferably a flash storage. In order to run the computer program, it is transferred to a computing device 28 via a data connection, either completely, in sections or corresponding to commands. The computing device 28 is preferably designed as a microprocessor.

The computing means 11 serve i.a. to generate drive signals 24 for actuating elements 12. The drive signals 24 are determined in dependence on the detected actual values $21_{ist}$ for the gap dimensions and/or the offset between the roughly adjusted flap 2 and the remaining body 3 and in dependence on the predetermined desired values $21_{soll}$ for the gap dimensions and/or the offset. The actual values $21_{ist}$ detected by the detection means 4 are transferred to the computing means via data lines 13. The drive signals 24 generated by the computing means 11 are transferred to the actuating elements 12 via data lines 14. The actuating elements 12 vary the relative position and orientation between the flap 2 and the remaining body 3. The actuating elements 12 preferably move the flap 2 about the axis of rotation defined by the hinges or joints via which the flap 2 is mounted to the body 3.

In the present embodiment, the actuating elements 12 are formed as electric linear motors or stepping motors which act on the flap 2 at effective points 15 to vary the position and orientation of the flap 2 relative to the remaining body 3. The actuating elements 12 or the effective points 15 are preferably disposed on a side of the flap 2 opposite to the hinges or joints. The actuating elements 12 can move the flap upwards and downwards and preferably also to the left and right (FIG. 1).

The transition between the flap 2 and the remaining body 3 is determined by the gap dimensions and/or the offset of the flap 2 relative to the remaining body 3. The transition may be defined either as subjective impression of one or more observer/s (e.g. the members of staff responsible for quality assurance) or objectively through a certain mathematical description. A mathematical description of the transition is e.g. disclosed in U.S. Pat. No. 4,498,776, U.S. Pat. No. 4,666,303, U.S. Pat. No. 5,416,590 and U.S. Pat. No. 5,999,265. These documents disclose different possible analytic descriptions of the transition between two parts, preferably between a flap and the remaining vehicle body and are hereby incorporated by reference with respect to their mathematical definition of a transition. Of course, there are many other feasible analytical descriptions of a transition.

Figure 3:
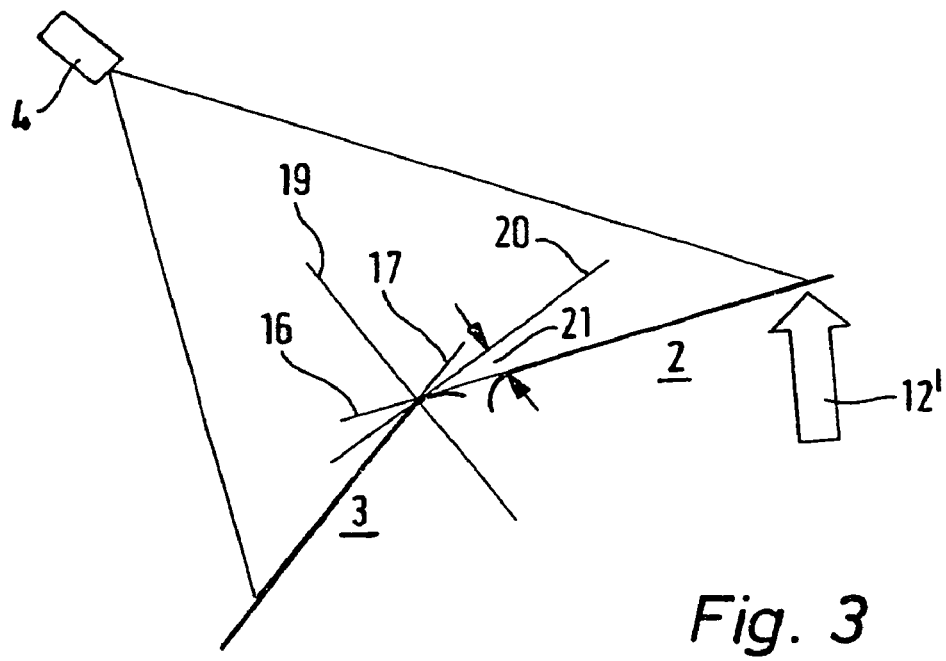
FIG. 3 shows a schematic view of a transition of less than zero between a flap and the remaining vehicle body.

FIG. 3 illustrates a situation in which the separation 21 between a measuring straight line 20 contacting the surface of the remaining body 3 and the surface of the flap 2 is substantially less than zero, i.e. the transition amount is relatively large. To correct this negative transition, the flap 2 is moved in a controlled manner in the direction of arrow 12' by the actuating elements 12 in accordance with the invention until the separation 21 has reached a specified desired value, preferably zero. Reference numeral 16 designates a first function for extrapolating a surface of the flap 2 beyond its end. Reference numeral 17 designates a second function for extrapolating a surface of the body 3 beyond its end. The intersection between the two functions 16, 17 is designated with reference numeral 18. Reference numeral 19 designates a vertical straight line which bisects the opening angle between the functions 16, 17. Reference numeral 20 designates the measuring straight line which intersects the vertical straight line 19 at right angles and which tangentially contacts the surface of the body 3.

Figure 4:
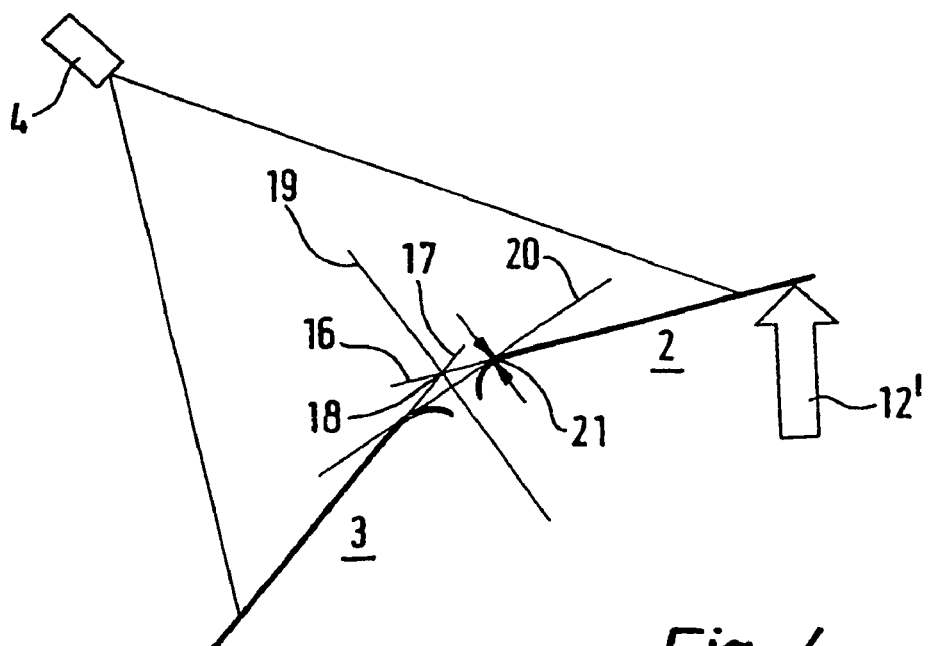
FIG. 4 shows a schematic view of a transition of approximately zero between a flap and the remaining vehicle body.

FIG. 4 shows the flap 2 in its finely adjusted installation position after termination of fine adjustment. The separation 21 has been reduced to almost zero through inventive regulation of the installation position.

Figure 5:
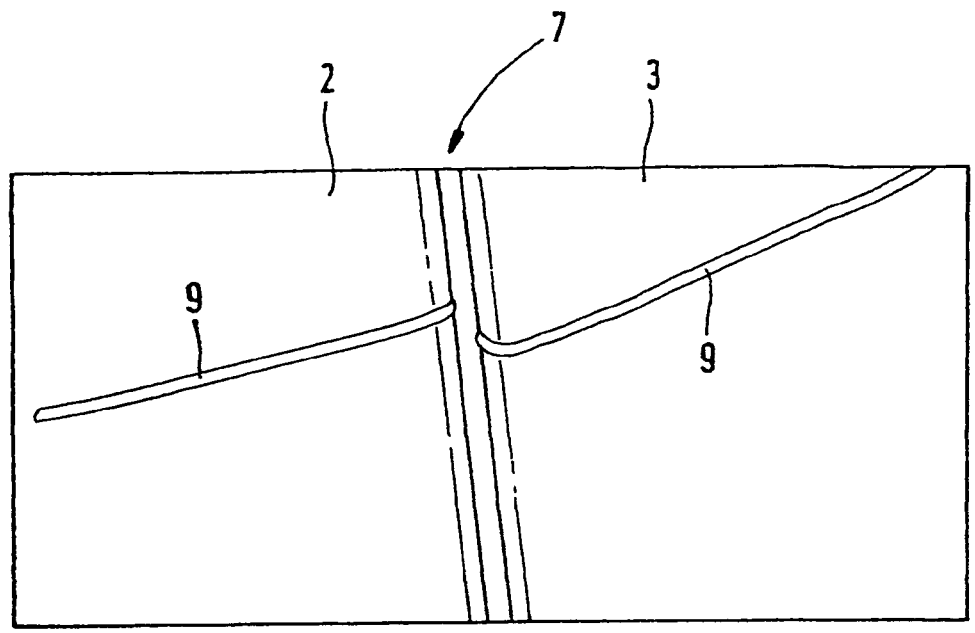
FIG. 5 shows an image recorded by optical detection means of the inventive device with a transition of less than zero between a flap and the remaining vehicle body.
Figure 6:
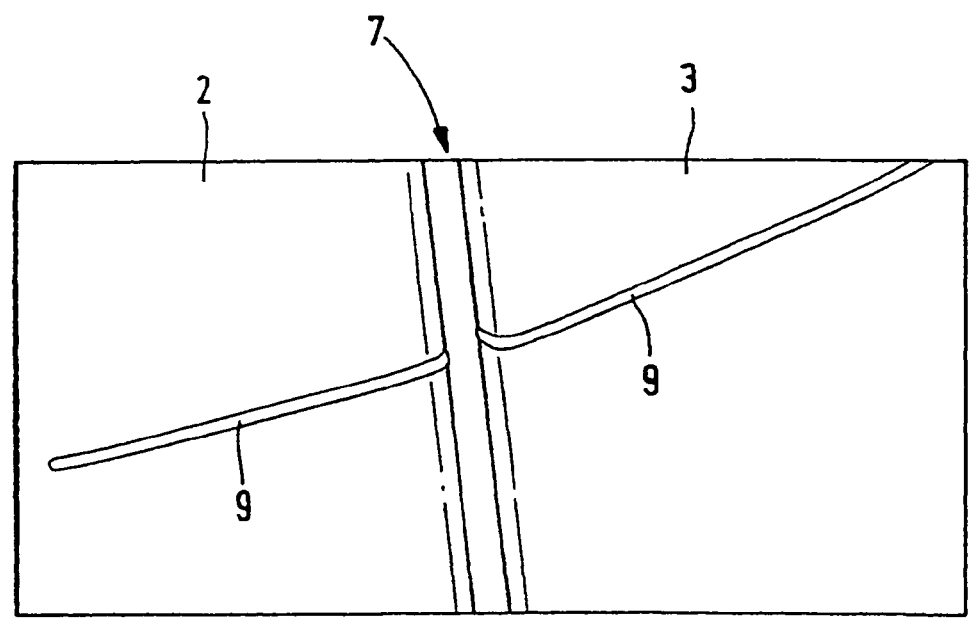
FIG. 6 shows an image recorded by optical detection means of the inventive device with a transition of approximately zero between a flap and the remaining vehicle body.
Figure 7:
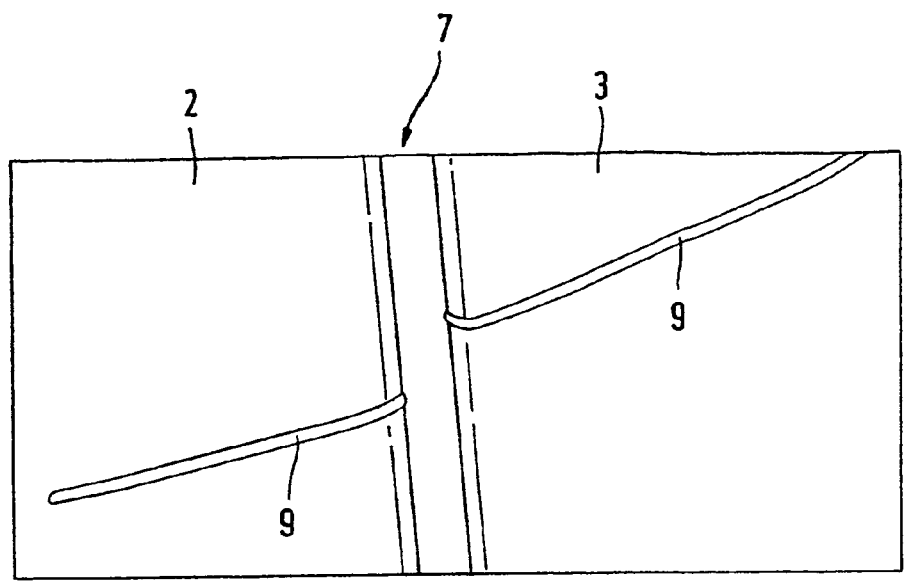
FIG. 7 shows an image recorded by optical detection means of the inventive device with a transition of more than zero between a flap and the remaining vehicle body.

FIGS. 5 to 7 show different images recorded by the optical detection means 4 in the region of a measuring location 7. FIG. 5 shows the image recorded by a laser sensor with a transition of −5 mm. FIG. 6 shows the same image, however, with a transition of 0 mm, and FIG. 7 shows the same image, however, with a transition of +5 mm. The images recorded by the optical detection means 4 in accordance with FIGS. 5 through 7 are evaluated in the computing means 11 to detect the transition (gap dimension and/or offset) between the flap 2 and the remaining body 3 at the measuring location 7. The computing means 11 then generate the drive signals 24 for the actuating elements 12 in dependence on the detected actual values $21_{ist}$ and in dependence on the specified desired values $21_{soll}$ (preferably to a zero transition).

Figure 8:
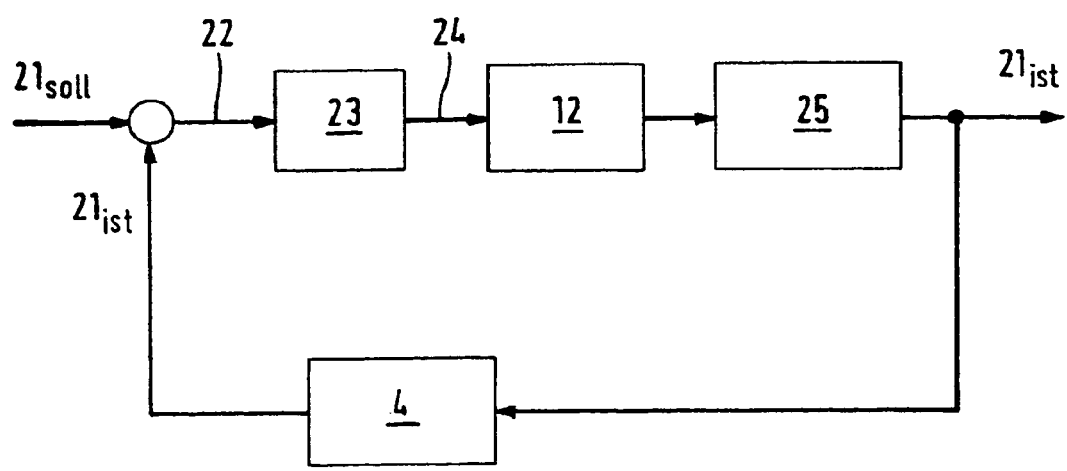
FIG. 8 shows a control loop structure to illustrate the inventive method for adjusting the gap dimensions and/or the offset between a flap and the remaining body of a vehicle in accordance with a preferred embodiment.

FIG. 8 shows a control loop structure to explain the inventive method. The detection means 4 (laser sensor) detect an actual value of the transition $21_{ist}$ and the measured actual value $21_{ist}$ is subtracted from a specified desired value for the transition $21_{soll}$. A transition=0 is preferably preset as desired value $21_{soll}$. The difference between the desired and actual values is called the control deviation 22. The control deviation 22 is supplied to a regulation means 23 which is preferably realized in the form of software. Towards this end, a corresponding computer program is run on the computing means 11 of the device 1. The regulation means 23 generate the drive signals 24 for the actuating elements 12 on the basis of the control deviation 22. The drive signals 24 therefore constitute the controlled variable for regulation. Driving the actuating elements 12 with the generated drive signals 24 causes displacement of the flap 2 relative to the remaining body 3 (position and/or orientation) by a certain amount. This displacement of the flap 2 is symbolized by an operational block 25. Displacement 25 of the flap 2 produces a new actual value $21_{ist}$ of the transition which is, in turn, detected by the detection means 4. Repeated run of the control loop structure of FIG. 8 causes approximation of the actual value $21_{ist}$ of the transition to the specified desired value $21_{soll}$ of the transition. If the desired deviation is zero, the control loop structure is run until the actual value $21_{ist}$ of the transition is equal to the desired value $21_{soll}$ of the transition.

We claim:

1. A method for key collar simulation in association with mounting and alignment of a moveable flap to a body of a motor vehicle, the method comprising the steps of:
   a) initially mounting the flap to the body in a roughly adjusted installation position for motion about an axis of rotation;
   b) optically detecting, following step a) and prior to painting the motor vehicle as well as prior to final mounting of locks, handles, and fixtures to the flaps and remaining body, actual values for a gap or offset between the flap and remaining portions of the body;
   c) generating, in dependence on the actual values detected in step b) and on specified desired values corresponding to a properly aligned position of the flap, drive signals for variation of a position and orientation of the flap relative to the remaining portions of the body using at least one actuating element cooperating with the flap; and
   d) regulating the at least one actuating element using the drive signals to pivot the flap about the axis of rotation for approximating the properly aligned position of the flap.

2. The method of claim 1, wherein desired values of the gap dimensions or offset of the flap relative to the remaining body are specified in such a manner that a transition between the flap and the remaining body at a measuring location is zero.

3. The method of claim 1, wherein the desired values of the gap dimensions or offset of the flap are specified relative to the remaining body in such a manner that a negative transition of less than zero is obtained between the flap and the remaining body at a measuring location.

4. The method of claim 1, wherein initial actual values of the gap dimensions or offset between the flap and the remaining body are detected at a first measuring location and approximated to specified desired values, and actual values are subsequently detected at least one further measuring location and approximated to specified desired values.

5. The method of claim 1, wherein the flap or the remaining body bordering the flap are plastically deformed if a deviation between the actual values, approximated to the desired values, and the specified desired values exceeds a predetermined limit value at least one measuring location.

6. The method of claim 1, further comprising issuing a request to a production line for producing further flaps or to an installation line for installing further flaps on the remaining body of vehicles, wherein production or installation parameters of the production line and the installation line are varied in dependence on the request if a deviation between the actual values, approximated to the desired values, and the specified desired values exceeds a predetermined limit value at least one measuring location.

7. The method of claim 1, wherein the actual values for the gap size or the displacement between the flap and the remaining body are recorded in a measuring region proximate a transition between the flap and the remaining body.

8. A computer program which can be run on a computing device or on a microprocessor, wherein the computer program is structured to perform the method of claim 1.

9. The computer program of claim 8, wherein the computer program is stored on a storage element, a flash storage, a random access memory, or a read only memory.

10. A device for key collar simulation in association with mounting and alignment of a moveable flap to a body of a motor vehicle, the device comprising:
   means for initially mounting the flap to the body in a roughly adjusted installation position for motion about an axis of rotation;
   means for optically detecting, following said initial mounting of the flap to the body in said roughly adjusted installation position, prior to painting the motor vehicle and prior to final mounting of locks, handles, and fixtures to the flaps and remaining body, actual values for a gap or offset between the flap and remaining portions of the body;
   means for generating, in dependence on said detected actual values and in dependence on specified desired values which correspond to a properly aligned position of the flap, drive signals for variation of a position and orientation of the flap relative to the remaining portions of the body using at least one actuating element cooperating with the flap; and
   means for regulating said at least one actuating element using said drive signals to pivot the flap about the axis of rotation for approximating said properly aligned position of the flap.

11. The device of claim 10, wherein said detection means comprise a camera laser unit having at least one illumination means or at least one laser, and with at least one image recording means, a CCD, or a CMOS camera.

12. The device of claim 10, wherein said at least one actuating element comprises an electromotor.

13. The device of claim 10, wherein said at least one actuating element comprises an electric step motor.

14. The device of claim 10, further comprising an industrial robot or other manipulation device to which said detection means are mounted for moving said detection means to predetermined measuring locations to detect the actual values of the gap dimensions or the offset between the flap of the vehicle and the remaining body at these measuring locations.

15. The device of claim 10, wherein the actual values of the gap size or offset between the flap and the remaining body are recorded at least one measuring region proximate a transition between the flap and the remaining body.

* * * * *